(12) United States Patent
Severini

(10) Patent No.: US 6,672,672 B1
(45) Date of Patent: Jan. 6, 2004

(54) FLOATING ATTACHMENT WASHER FOR A VEHICLE SEAT

(75) Inventor: Joseph Severini, Holland Landing (CA)

(73) Assignee: Intier Automotive Inc., Aurora (CA)

(*) Notice: Subject to any disclaimer, the term of this patent is extended or adjusted under 35 U.S.C. 154(b) by 0 days.

(21) Appl. No.: 09/980,047

(22) PCT Filed: Jun. 13, 2000

(86) PCT No.: PCT/CA00/00709
§ 371 (c)(1),
(2), (4) Date: Feb. 25, 2002

(87) PCT Pub. No.: WO00/76801
PCT Pub. Date: Dec. 21, 2000

Related U.S. Application Data
(60) Provisional application No. 60/139,261, filed on Jun. 15, 1999.

(51) Int. Cl.[7] .................................................. A47B 97/00
(52) U.S. Cl. .................... 297/463.1; 411/533; 411/546
(58) Field of Search ........................... 297/463.1, 463.2, 297/344.1, 440.1; 411/546, 533, 531, 352, 353; 248/429, 430

(56) References Cited

U.S. PATENT DOCUMENTS

| 4,094,489 A | * | 6/1978 | Yoshimura |
| 4,295,766 A | | 10/1981 | Shaw |
| 4,597,552 A | * | 7/1986 | Nishino |
| 4,860,513 A | | 8/1989 | Whitman |
| 4,952,107 A | * | 8/1990 | Dupree |
| 5,006,025 A | * | 4/1991 | Duran |
| 5,028,190 A | | 7/1991 | Loughlin, Jr. et al. |
| 5,037,259 A | * | 8/1991 | Duran et al. ............... 411/173 |
| 5,040,917 A | * | 8/1991 | Camuffo |
| 5,098,765 A | | 3/1992 | Bien |
| 5,129,768 A | | 7/1992 | Hoyle et al. |
| 5,152,582 A | | 10/1992 | Magnuson |
| 5,326,206 A | | 7/1994 | Moore |
| 5,378,099 A | | 1/1995 | Gauron |
| 5,707,097 A | | 1/1998 | Horwill |
| 6,059,503 A | * | 5/2000 | Johnson |
| 6,131,346 A | * | 10/2000 | Kordes |

FOREIGN PATENT DOCUMENTS

| DE | G 88 12 500 | 1/1989 |
| FR | 2629400 A1 | 4/1988 |
| FR | 2665125 A1 | 7/1990 |
| FR | 2781849 A1 | 7/1998 |
| GB | 803696 | 10/1958 |

* cited by examiner

Primary Examiner—Peter R. Brown
Assistant Examiner—Stephen Vu
(74) Attorney, Agent, or Firm—Clark Hill PLC

(57) ABSTRACT

An attachment washer assembly for aligning and fastening an attachment bracket (32) to a floor panel (20) has a first member (40) having a tubular ring (44) extending from a cylindrical flange (42) and a second member (5) having a tubular ring (54) extending from a cylindrical flange (56). The ring of the first member is frictionally fitted within the ring of the second member retaining the attachment washer assembly within a preformed aperture formed in the attachment bracket. The flanges slidingly engage the peripheral side portions of the bracket along opposing sides of the aperture. The ring (54) of the second member has an outer diameter which is less than the diameter of the aperture and the flanges (42, 56) having an outer diameter greater than the diameter of the aperture such that the attachment washer assembly is moveable within the preformed aperture for alignment with an aperture in the floor panel to receive a fastener therethrough and secure the bracket to the panel.

3 Claims, 3 Drawing Sheets

FLOATING ATTACHMENT WASHER FOR A VEHICLE SEAT

This application claims the benefit of Provisional application Ser. No. 60/139,261, filed Jun. 15, 1999.

BACKGROUND OF THE INVENTION

1. Field of Invention

The subject invention relates to attachment washer assembly for aligning and securing an attachment bracket of a seat assembly to a floor panel of a vehicle.

2. Background of Invention

A vehicle seat is generally pre-assembly and installed into a vehicle on an assembly line. The vehicle seat comprises a seat track assembly on which a seat cushion is mounted. A seat back is hingedly mounted to the seat cushion. The seat track assembly comprises a riser assembly having four downwardly extending legs and a slide track. An example of such seat track assemblies are described in U.S. Pat. No. 5,741,000. The distal end of each of the legs has a pre-formed aperture. These apertures align with pre-formed apertures on the floor pan for receiving fasteners during the assembly process.

The apertures on the seat track and the floor pan are designed to align to receive the fasteners therethrough. An accepted tolerance is included in the design. However, in practise, the tolerances of components for the seat track often exceed the tolerance limits as the manufacturing processes compound the deviations. As a result, the pre-formed apertures often do not align perfectly as designed. Despite the misalignment, these seat are still installed into a vehicle. Typically, the first two legs are aligned and then fastened to the floor pan. The remaining two legs are then forcefully aligned and fastened. The result is that the slide track may be slightly twisted, thus increasing sliding track effort as well as binding conditions and potential buzz, squeak and rattle (BSR).

It is possible to lower the tolerance of each pre-formed attachment aperture. However, increases in the tolerances reduces the contact surface between the components with the resulting reduction in clamping forces.

It is also possible to increase the precision of the manufacturing processes to ensure that the design tolerances are achieved. However, increased precision can only be achieved by increased manufacturing costs.

Therefore, it is desirable to provide an assembly for improving the alignment between the apertures in the seat assembly and the apertures in the vehicle for assembly.

SUMMARY OF THE INVENTION

The subject invention relates to an attachment washer assembly for aligning an attachment bracket with an aperture in a support structure. The attachment bracket has a preformed aperture therethrough having a first diameter. The attachment washer comprises a first member having a cylindrical flange and a tubular ring extending from the flange with the tubular ring forming an axial bore through the first member. A second member has a cylindrical flange and a tubular ring extending from the flange with the tubular ring forming an axial bore through the second member. The ring of the first member is inserted and frictionally fitted within the ring of the second member for retaining the attachment washer assembly within the preformed aperture with the flanges of the first and second members slidingly engaging opposite sides of the bracket. The ring of the second member has an outer diameter which is less than the first diameter of the preformed aperture and the flanges have an outer diameter greater than the first diameter such that the attachment washer assembly is moveable within the preformed aperture for alignment with the aperture in the support structure.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
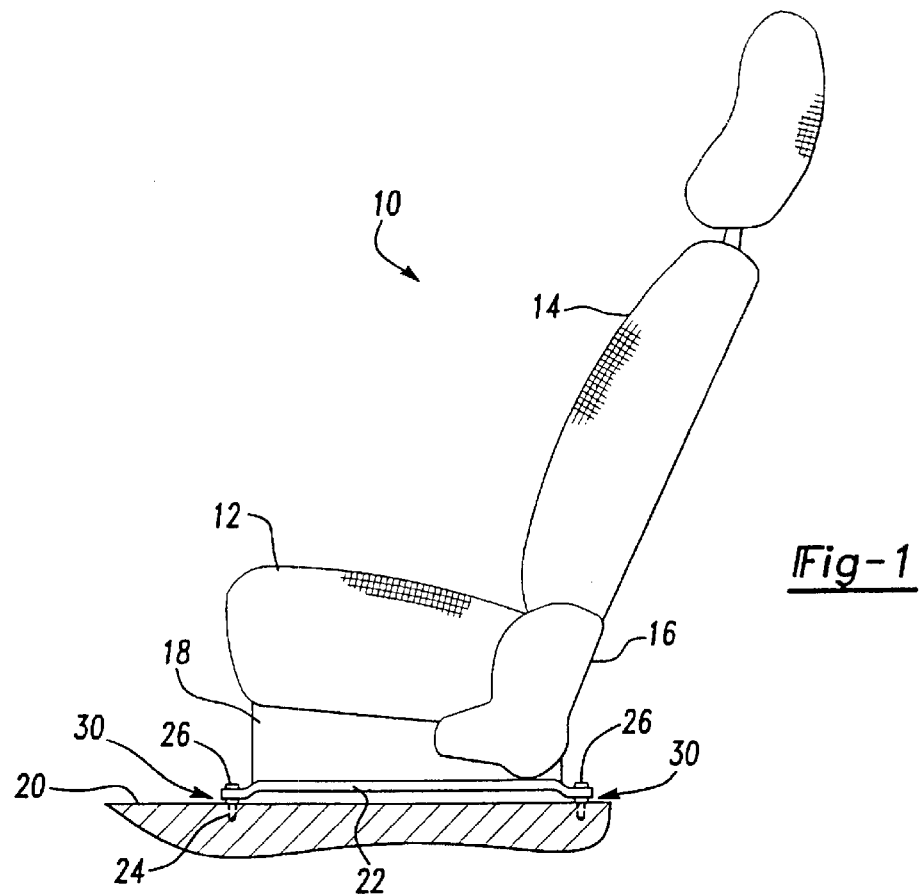
FIG. 1 is a side view of a vehicle seat assembly secured to the floor pan of a vehicle by an attachment washer assembly according to the subject invention.

Referring to the Figures, a vehicle seat assembly for use in an automotive vehicle is generally shown at 10 in FIG. 1. The seat assembly 10 includes a generally horizontal seat cushion 12 and a generally upright seat back 14 coupled to the seat cushion 12 by a recliner mechanism 16. The seat assembly 10 further includes a riser 18 attached to the bottom of the seat cushion 12 for elevating the seat assembly 10 above a floor panel 20 of the vehicle. An attachment bracket 22 is fixedly secured to the riser 18 for attaching the seat assembly 10 to the floor panel 20. The floor panel 20 includes a plurality of apertures 24 therein for receiving a fastener 26 to secure the attachment bracket 22 to the floor panel 20. The subject invention includes an attachment washer assembly generally shown at 30 which is assembled to the attachment bracket 22 for alignment with the apertures 24 in the floor panel 20. That is, the attachment washer assembly 30 aligns the attachment bracket 22 with the apertures 24 in the floor panel 20 for receipt of the fasteners 26 therethrough to fixedly secure the seat assemble 10 to the vehicle.

It should be appreciated that the attachment bracket 22 may be a separate component, may be part of the riser 18, part of a adjustable sliding seat track as exemplified in U.S. Pat. No. 5,741,000 which is incorporated herein by reference, or any other type of attachment bracket for securing a workpiece to a support structure utilizing the attachment washer assembly 30 without varying from the scope of the invention.

Figure 2:
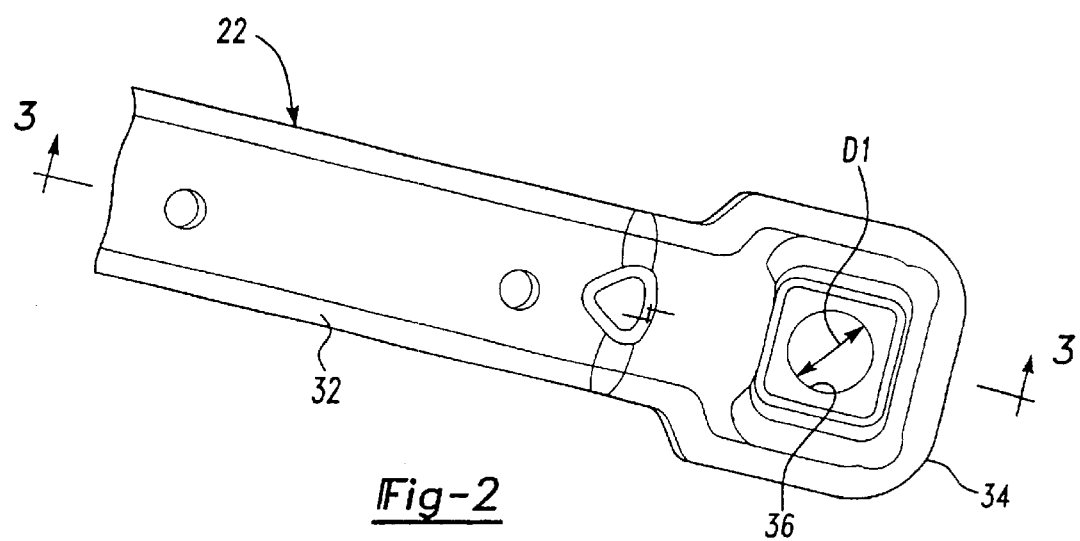
FIG. 2 is a perspective view of an attachment bracket of the seat assembly.
Figure 3:
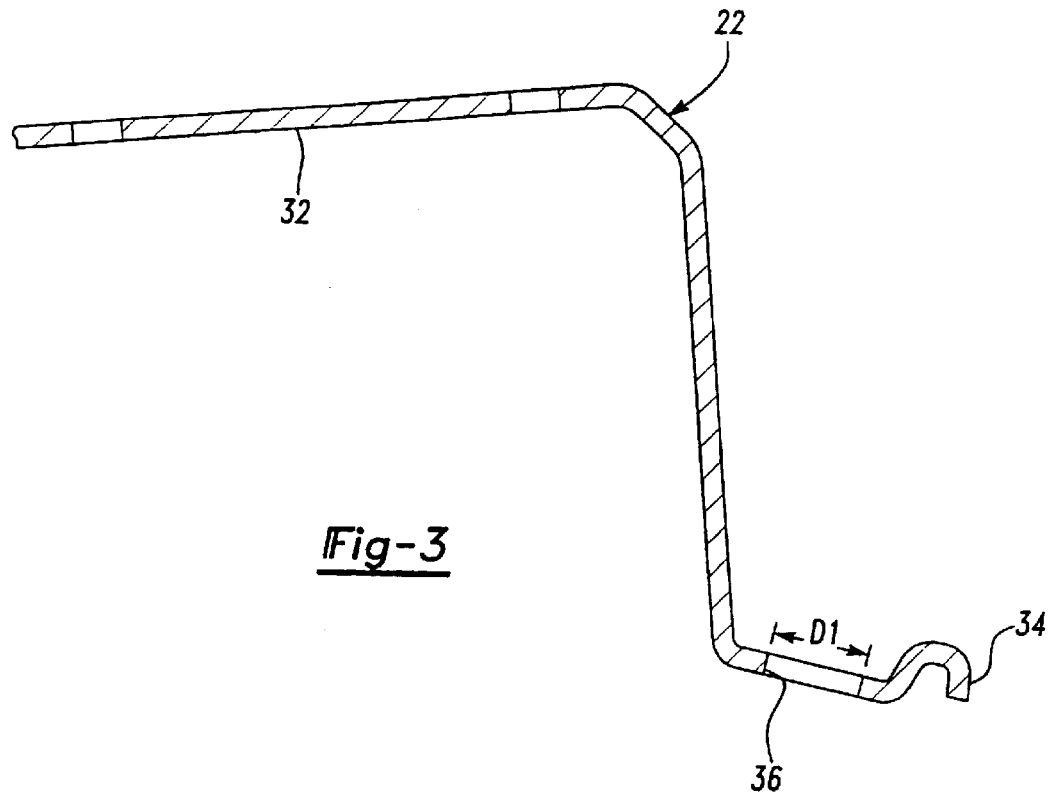
FIG. 3 is a cross-sectional view taken along line 3—3 of FIG. 2.

Referring to FIGS. 2 and 3, a portion of the attachment bracket 22 is shown. The attachment bracket 22 includes a elongated plate 32 having a distal end 34. An aperture 36 having a predetermined diameter D1 is formed through the plate 32 adjacent to the distal end 34 for alignment with one of the apertures 24 in the floor panel 20. The apertures 36 and 24 in the preferred embodiment are cylindrical, but may have other shape.

Figure 4:
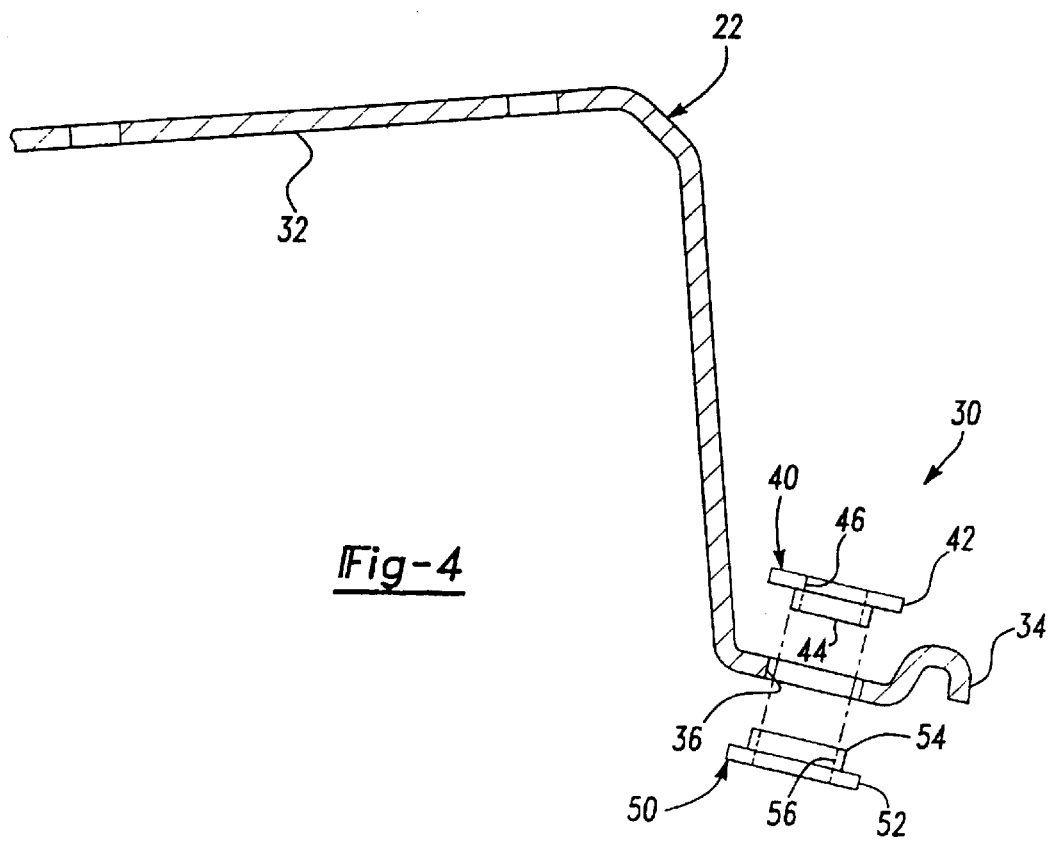
FIG. 4 is a partially exploded sectional view of the attachment bracket and attachment washer assembly.

Referring to FIG. 4, the attachment bracket 22 is shown in cross-section and the attachment washer assembly 30 is shown exploded along opposing sides of the aperture 36 of the bracket 22. The attachment washer assembly 30 includes a first member, or washer, 40. The first member 40 comprises a cylindrical flange 42 having an outer diameter that is larger than the diameter D1 of the aperture 36 in the bracket 22. The first member 40 further includes a tubular ring 44 extending tangentially from the flange 42 and forming an axial through bore 46. The attachment washer 30 further includes a second member, or washer, 50. The second member 50 similarly comprises a cylindrical flange 52 having an outer diameter that is larger than the diameter D1 of the aperture 36 in the bracket 22. The second member 50 further includes a tubular ring 54 extending tangentially from the flange 52 and forming an axial through bore 56. The diameter of the bore 56 is slightly larger than the outer diameter of the tubular ring 44 such that the ring 44 may be received and inserted into the bore 56 of the tubular ring 54. The ring 44 may therefore be frictionally fit and retained within the bore 56 of the ring 54. Additionally, the outer diameter of the tubular ring 54 is less than the diameter D1 of the aperture 36 in the bracket 22 such that the ring 54 may be received and inserted into the aperture 36. The flanges 42, 52 of the respective members 40, 50 extended outside of the aperture 36 to overlap with the plate 32 around the perimeter and on opposing sides of the aperture 36 as shown.

Figure 5:
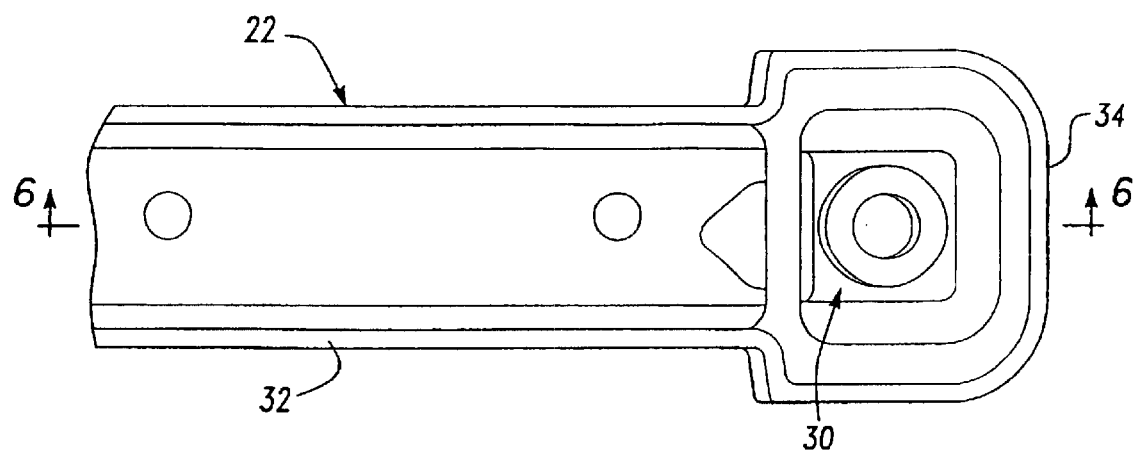
FIG. 5 is a perspective view of the attachment washer assembly installed on the attachment bracket.
Figure 6:
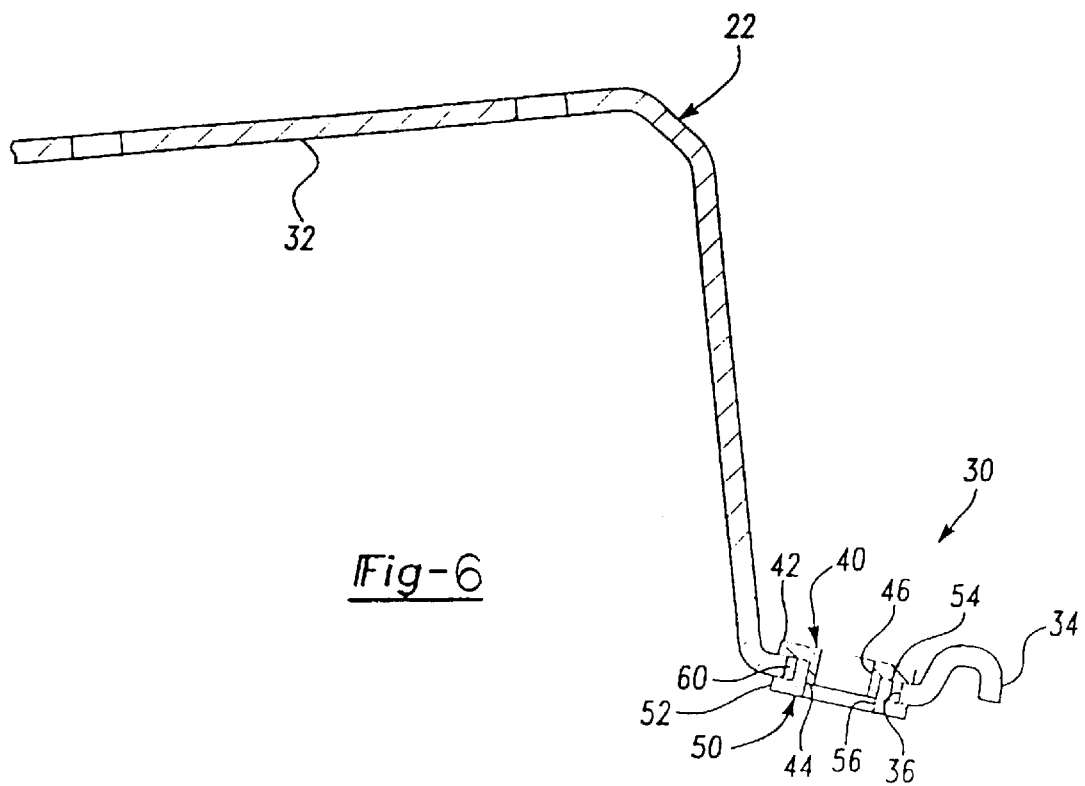
FIG. 6 is a cross-sectional view taken along line 6—6 of FIG. 5.

Referring to FIGS. 5 and 6, the attachment washer assembly 30 is shown assembly to the attachment bracket 22. In assembly, the first member, or washer, 40 is seated within the aperture 36 of the bracket 22 from a first side of the attachment bracket 22 and the second member, or washer, 50 is seated within the aperture 36 from a second, or opposite, side of the attachment bracket 22. More specifically, the tubular ring 54 of the second member 50 is inserted into the aperture 36 from one side of the bracket 22. The flange 52 overlaps and engages with the portion of the plate 32 formed around the perimeter of the aperture 36. The tubular ring 44 of the first member 40 is now inserted into the bore 56 of the second member 50 such that the ring 44 is frictionally fit within the bore 56 of the ring 54. The flange 42 similarly overlaps and engages with the opposite side or portion of the plate 32 formed around the perimeter of the aperture 36. The members 40, 50 of the attachment washer assembly 30 are secured to the bracket 22 and retained within the aperture 36 by the friction fit between the rings 44 and 54 and by the overlapping of the flanges 42 and 52 with the opposing perimeters of the aperture 36. Since the outer diameter of the ring 54 is less than the diameter D1 of the aperture 36, a gap 60 remains therebetween and the attachment washer assembly 30 may move or slide laterally, in a 360 degree direction, within the aperture 36. Further, the diameter of the bore 46 in the first member 40 is sized to receive one of the fasteners 26 therethrough.

After assembly of the attachment washer assembly 30 to the attachment bracket 22, the bracket 22 may be positioned and attached to the floor panel 20. Specifically, the attachment bracket 22 is supported on the floor panel 20 with the aperture 36 in the bracket 22 generally aligned with the aperture 24 in the floor panel 20. With the apertures 36 and 24 generally aligned, such as in the vertical axial direction, the bore 46 of the first member 40 will be aligned with the aperture 24 in the floor panel 20 for receiving the fastener 26. If the aperture 36 is slightly misaligned with the aperture 24, the attachment washer assembly 30 may be moved laterally within the aperture 36 to adjust the alignment of the bore 46 with the aperture 24. Therefore, the axial alignment between the attachment washer assembly 30 and the aperture 24 in the floor panel 20 is accomplished relatively easily and without requiring increased tolerances therebetween.

Once the attachment washer assembly 30 is aligned with the aperture 24 in the floor panel 20, one of the fasteners 26 is inserted through the bore 46 in the first member and into the aperture 24 in the floor panel 20. The fastener 26 may be a threaded screw, bolt, rivet or the like. The aperture 24 in the floor panel 20 may likewise include a threaded surface for mating engagement with the fastener 26 to secure the attachment bracket 22 to the floor panel 20. Further, the fastener 26 will compress the first and second members 40, 50 against the opposing perimeter portions of the aperture 36 while the flanges 42, 52 prevent the members 40, 50 from passing through the aperture 36. Finally, the seat assembly 10 is properly aligned and secured fastened to the floor panel 20 of the vehicle.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed is:

1. An attachment washer assembly for aligning an attachment bracket with an aperture in a support structure, said attachment bracket having a preformed aperture therethrough having a first diameter; the attachment washer comprising:

a first member having a cylindrical flange and a tubular ring extending from said flange, said tubular ring forming an axial bore through said first member;

a second member having a cylindrical flange and a tubular ring extending from said flange, said tubular ring forming an axial bore through said second member;

said ring of said first member inserted and frictionally fitted within the ring of said second member for retaining said attachment washer assembly within said preformed aperture with said flanges of said first and second members slidingly engaging opposite sides of said bracket;

said ring of said second member having an outer diameter which is less than said first diameter of said preformed aperture and said flanges having an outer diameter greater than said first diameter such that said attachment washer assembly is moveable within the preformed aperture for alignment with the aperture in the support structure.

2. An attachment washer assembly for aligning an attachment bracket of a vehicle seat assembly with an aperture in a floor panel of a vehicle, said attachment bracket having a preformed aperture therethrough having a first diameter; the attachment washer comprising:

a first member having a cylindrical flange and a tubular ring extending from said flange, said tubular ring forming an axial bore through said first member;

a second member having a cylindrical flange and a tubular ring extending from said flange, said tubular ring forming an axial bore through said second member;

said ring of said first member inserted and frictionally fitted within the ring of said second member for retaining said attachment washer assembly within said preformed aperture with said flanges of said first and second members slidingly engaging opposite sides of said bracket;

said ring of said second member having an outer diameter which is less than said first diameter of said preformed aperture and said flanges having an outer diameter greater than said first diameter such that said attachment washer assembly is moveable within the preformed aperture for alignment with the aperture in the floor panel.

3. A seat assembly adapted to be secured to a floor panel of an automotive vehicle comprising:

a generally horizontal seat cushion for supporting a seat occupant on said seat assembly;

a generally upright seat back coupled to said seat cushion;

an attachment bracket attached to said seat cushion for fixedly securing said seat assembly to the floor panel, said attachment bracket having a preformed aperture therethrough having a first predetermined diameter for alignment with an aperture in the floor panel; and an attachment washer assembly for aligning said attachment bracket with the aperture in the floor panel and securing said seat assembly to the floor panel, said attachment washer assembly including a first member having a cylindrical flange and a tubular ring extending from said flange, said tubular ring forming an axial bore through said first member; a second member having a cylindrical flange and a tubular ring extending from said flange, said tubular ring forming an axial bore through said second member; said ring of said first member inserted and frictionally fitted within the ring of said second member for retaining said attachment washer assembly within said preformed aperture with said flanges of said first and second members slidingly engaging opposite sides of said bracket; said ring of said second member having an outer diameter which is less than said first diameter of said preformed aperture and said flanges having an outer diameter greater than said first diameter such that said attachment washer assembly is moveable within the preformed aperture for alignment with the aperture in the floor panel.

* * * * *